United States Patent
Mukai et al.

(10) Patent No.: US 9,783,229 B2
(45) Date of Patent: Oct. 10, 2017

(54) VEHICLE STEERING CONTROL SYSTEM

(71) Applicants: DENSO CORPORATION, Kariya, Aichi-pref. (JP); NATIONAL UNIVERSITY CORPORATION NAGOYA INSTITUTE OF TECHNOLOGY, Nagoya-shi, Aichi (JP)

(72) Inventors: Yasuhiko Mukai, Anjo (JP); Yoshifumi Morita, Gifu (JP); Hiroyuki Ukai, Nagoya (JP); Makoto Iwasaki, Nagoya (JP); Takeshi Wada, Nagoya (JP)

(73) Assignees: DENSO CORPORATION, Kariya (JP); NATIONAL UNIVERSITY CORPORATION NAGOYA INSTITUTE OF TECHNOLOGY, Nagoya-shi (JP)

( * ) Notice: Subject to any disclaimer, the term of this patent is extended or adjusted under 35 U.S.C. 154(b) by 43 days.

(21) Appl. No.: 14/837,000

(22) Filed: Aug. 27, 2015

(65) Prior Publication Data
US 2015/0367883 A1 Dec. 24, 2015

Related U.S. Application Data

(62) Division of application No. 13/945,387, filed on Jul. 18, 2013, now abandoned.

(30) Foreign Application Priority Data

Aug. 7, 2012 (JP) .................................. 2012-174856

(51) Int. Cl.
*B62D 6/00* (2006.01)
*G05B 15/02* (2006.01)
(Continued)

(52) U.S. Cl.
CPC ............. *B62D 6/003* (2013.01); *B62D 5/008* (2013.01); *B62D 5/0463* (2013.01); *B62D 6/00* (2013.01);
(Continued)

(58) Field of Classification Search
None
See application file for complete search history.

(56) References Cited

U.S. PATENT DOCUMENTS 5,822,709 A * 10/1998 Fujita ..................... B62D 7/159
701/38
6,892,123 B2 * 5/2005 Hac ........................ B62D 6/003
701/48

(Continued)

FOREIGN PATENT DOCUMENTS

JP 2011-186589 9/2011

OTHER PUBLICATIONS

Laine; Coordination of Vehicle Motion and Energy Management Control Systems for Wheel Motor Driven Vehicles; Jun. 2007; Proceedings of the 2007 IEEE Intelligent Vehicles Symposium; pp. 773-780; http://ieeexplore.ieee.org/abstract/document/4290210/.*
Aug. 13, 2015 Office Action issued in Chinese Application No. 201310334668.5 (with translation).
(Continued)

*Primary Examiner* — John R Olszewski
*Assistant Examiner* — David Merlino
(74) *Attorney, Agent, or Firm* — Nixon & Vanderhye P.C.

(57) ABSTRACT

A control system calculates inputs to a control target that has m inputs and n outputs (m=n, each of m and n is a natural number that is more than one), while designating a plurality of combinations of the inputs and the outputs. A feedback controller calculates, with respect to each designated combination, a control input to a non-interference controller based on a difference between a target value and a current value of the control quantity to make the current value
(Continued)

follow the target value. The non-interference controller executes, with respect to each designated combination, a non-interference control to reduce influence due to mutual interference between n control quantities. This reduces the number of combinations of the inputs and the outputs, the combinations whose mutual interference needs considering; thereby, the non-interference control may be easily achieved.

9 Claims, 15 Drawing Sheets

(51) Int. Cl.
  *G05B 11/58* (2006.01)
  *B62D 5/00* (2006.01)
  *B62D 5/04* (2006.01)
  *B62D 7/15* (2006.01)
  *G05B 11/32* (2006.01)
  *B62D 6/08* (2006.01)

(52) U.S. Cl.
  CPC ............... *B62D 6/08* (2013.01); *B62D 7/159* (2013.01); *G05B 11/32* (2013.01); *G05B 11/58* (2013.01); *G05B 15/02* (2013.01)

(56) References Cited

U.S. PATENT DOCUMENTS

| | | | |
|---|---|---|---|
| 7,689,337 B2 | 3/2010 | Post | |
| 8,473,156 B2 | 6/2013 | Lauer et al. | |
| 9,020,706 B2* | 4/2015 | Hanzawa | B62D 15/025 |
| | | | 701/48 |
| 9,180,862 B2* | 11/2015 | Tokimasa | B60W 10/184 |
| 2004/0002794 A1 | 1/2004 | Pillar et al. | |
| 2004/0030477 A1 | 2/2004 | Gerdes | |
| 2004/0158377 A1 | 8/2004 | Matsumoto et al. | |
| 2005/0131620 A1 | 6/2005 | Bowyer | |
| 2006/0041360 A1 | 2/2006 | Post, II | |
| 2007/0250234 A1* | 10/2007 | Ito | B62D 6/008 |
| | | | 701/41 |
| 2008/0047775 A1 | 2/2008 | Yamazaki | |
| 2010/0145549 A1* | 6/2010 | Lee | B60W 10/06 |
| | | | 701/1 |
| 2012/0245797 A1* | 9/2012 | Ono | B62D 6/008 |
| | | | 701/42 |
| 2014/0046548 A1 | 2/2014 | Mukai et al. | |

OTHER PUBLICATIONS

H. Lee et al., "Multi-stage Non-Interference Method by Series Parallel Connection of Predistorters," Assignment No. 1455045, Dec. 2004, 62 pages.

Mukai et al., U.S. Appl. No. 13/939,760, filed Jul. 11, 2013.

* cited by examiner

VEHICLE STEERING CONTROL SYSTEM

CROSS REFERENCE TO RELATED APPLICATION

The present application is a divisional of U.S. patent application Ser. No. 13/945,387, filed Jul. 18, 2013, which is based on Japanese Patent Application No. 2012-174856 filed on Aug. 7, 2012, the disclosure of which is incorporated herein by reference.

TECHNICAL FIELD

The present disclosure relates to a control system which controls a control target which outputs more than one control quantity.

BACKGROUND ART

[Patent literature 1] JP 2011-186589 A

A control system is known which uses a control target model to perform non-interference control so as to negate or eliminate mutual interference caused by a plurality of control quantities outputted by a control target (refer to Patent literature 1). Such non-interference control negates the mutual interference by previously adding a quantity equivalent to the mutual interference to the control quantity.

Generally, a control target model, an input signal, or an output signal may suffer unintentional disturbance. Therefore, when a control target has a great number of control quantities of inputs and outputs, to pose a great number of combinations of mutual interference, it becomes difficult to realize non-interference control in calculating a transfer function etc.

Examples of control systems that pose mutual interference include a vehicle steering control system, which operates a plurality of steering actuators depending on steering wheel manipulation by a driver on a vehicle to thereby control actual steering angles of front wheels and rear wheels. To be specific, the actuators include an electric power steering which assists a steering torque of a steering wheel by a driver; a variable gear transfer steering which flexibly changes a turning angle of a front wheel with respect to a turning angle of the steering wheel; and an active rear steering wheel which flexibly changes a turning angle of a rear wheel with respect to a turning angle of the steering wheel.

Operations of the plurality of actuators output several vehicle motion properties such as a steering angle $\theta s$, a yaw angle velocity $\gamma$, and a lateral acceleration $ay$. At this time, the plurality of actuators operate cooperatively with a rotational movement axis (yaw axis) around the center gravity of the vehicle, involving mutual interference. Furthermore, the vehicle receives disturbance due to rainstorm, blown fragments, or a road surface reactive force depending on the grounding state between tires and road surfaces. Such disturbance cannot be detected or presumed in real time practically by any measure.

Thus, it is not realistic to achieve non-interference control, which presumes mutual interference between the vehicle motion properties based on operations of a plurality of actuators and which adds previously a quantity equivalent to the mutual interference to a control quantity. To that end, a person with a skilled technique needs to make trial-and-error to adjust each of the actuators; this requires a number of time and man hours. The above situation may arise not only in a vehicle steering control system but also in a control system that may undergo mutual interference between a plurality of outputs of a control target.

SUMMARY

It is an object of the present disclosure to provide a non-interference control in a control system which controls a control target which outputs a plurality of control quantities, reducing influence by mutual interference between outputted control quantities.

To achieve the above object, according to an aspect of the present disclosure, a control system is provided to control a control target that provides a plurality of n outputs of control quantities based on a plurality of m inputs of operation quantities, wherein m=n and each of m and n is a natural number that is more than one. The control system includes a plurality of feedback controllers and a non-interference controller. Each of the plurality of feedback controllers is to calculate the operation quantity based on a difference between (i) a target value, which is generated by a target value generator, the target value corresponding to the control quantity, and (ii) a current value of the output provided by the control target. The non-interference controller is provided between (i) the plurality of feedback controllers and (ii) the control target; the non-interference controller is to execute a non-interference control to reduce influence due to mutual interference between the outputs provided by the control target. Further, combinations of the inputs and the outputs in the control target are designated; and the non-interference control by the non-interference controller and the feedback control by the feedback controllers are executed with respect to each of the designated combinations of the inputs and the outputs.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following describes embodiments of the present disclosure with reference to drawings.

(Control System)

Figure 1:
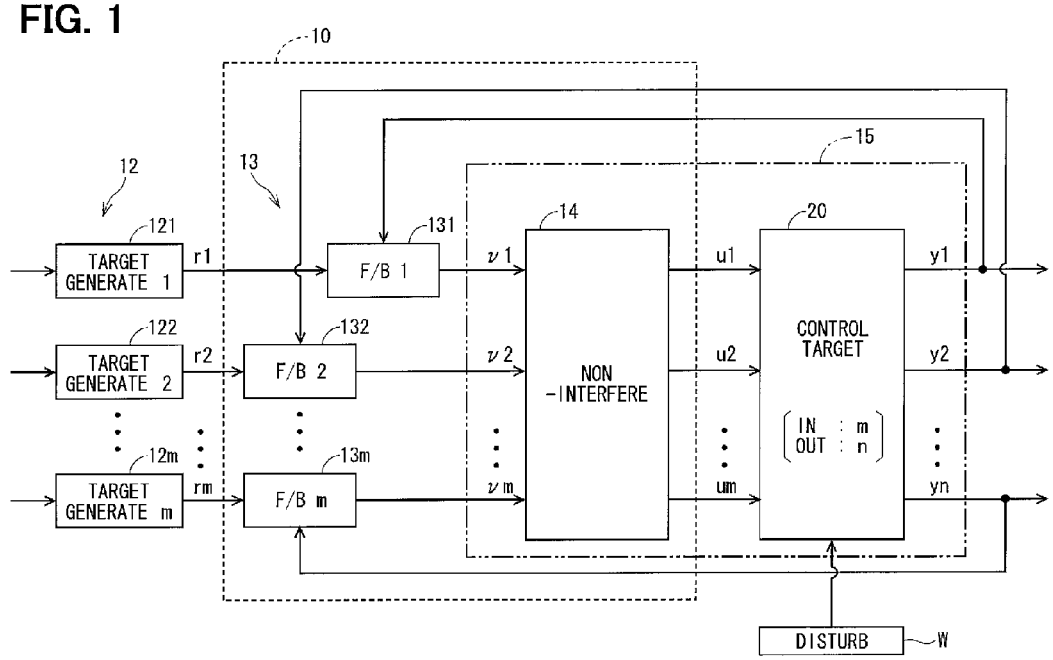
FIG. 1 is a block diagram of a control system according to an embodiment of the present disclosure.

The following will explain a configuration of a control system 10 according to an embodiment of the present disclosure with reference to FIG. 1. The control system 10 according to the embodiment is surrounded by broken-line block in FIG. 1. The control system 10 calculates inputs to a control target 20 having m inputs and n outputs (m=n, m is a natural number that is more than one) based on target values r1, r2, . . . , rm which are generated by m target value generators 121, 122, . . . , 12m (which are collectively referred to as a target value generator 12). In this case, mutual interference arises in between the control quantities y1, y2, . . . , yn that are n outputs of the control target 20. In addition, each combination of (i) an input among the inputs and (ii) an output among the outputs in the control target 20 may be designated optional. The control quantity serving as an output of the control target 20 may be any one of physical quantities such as temperature, pressure, and position.

The control system 10 includes a feedback controller 13 and a non-interference controller 14. The feedback controller 13 includes m feedback controllers 131, 132, . . . , 13m corresponding to target values r1, r2, . . . , rm. The feedback controller 13 calculates the control inputs v1, v2, . . . , vm to the non-interference controller 14, with respect to the respective designated combinations of the inputs and the outputs, based on differences between (i) current values of the control quantities y1, y2, . . . , yn outputted by the control target 20 and (ii) target values r1, r2, . . . , rm, using PID control etc. in order to make current values follow target values.

The non-interference controller 14 is provided in between the feedback controller 13 and the control target 20 and constitutes a non-interference control model 15 along with the control target 20. The non-interference controller 14 executes a non-interference control with respect to each of the designated combinations of the inputs and the outputs to reduce influence due to mutual interference between the control quantities y1, y2, . . . , yn. Thus, the control target 20 receives m inputs u1, u2, . . . , um that have undergone the non-interference control. Further, the combination of an input and an output may be designated based on a designation criteria to give a priority to a combination to provide a maximum gain, for instance.

When such each combination of an input and an output is not designated, the number of possible combinations may reach maximally "m×n" based on the dependency from respective inputs to respective outputs; thus, interferences between the combinations "m×n" in maximum need considering. Further, when the influence of disturbance W to the control target 20 is added, it is difficult to realize a non-interference control actually.

In contrast, under the control system 10 according to the present embodiment, when m inputs and n outputs of the control target 20 have one-to-one correspondence (i.e., m=n), n combinations may be designated. Then, non-interference control may be applied to n combinations of the inputs and the outputs; this may reduce greatly the number of combinations of the inputs and the outputs, the combinations of which interferences need to be considered. In addition, the feedback control may be applied to each of n combinations, negating an error between a non-interference control term and the control target 20 to amend a mutual interference term automatically. Therefore, the non-interference control can be realized easily without considering the variation of the control target 40 due to the disturbance W.

In addition, the control system according to the embodiment of the present disclosure may be applied to a vehicle steering control system. In the vehicle steering control system, the inputs to a control target include operation quantities such as instruction voltages to actuators of an electric power steering, a variable gear transfer steering, and an active rear steering, for example. In addition, the outputs from the control target include vehicle motion properties of a steering angle (θs), a yaw angle velocity (γ), and a lateral acceleration (ay). In this case, the plurality of actuators operate cooperatively with a yaw axis of the vehicle, causing mutual interference, which needs adjustment by a skilled technique person. To that end, the control system according to the embodiment of the present disclosure may be used to the vehicle steering control system. That is, the non-interference control and feedback control may be applied to each of the designated combinations of the inputs and the outputs, thereby achieving easily non-interference control. This can reduce time or man hours by a skilled person making trial-and-error to adjust each of the actuators.

(Vehicle Steering Control System)

The following will explain a vehicle steering control system, which a control system according to the embodiment of the present disclosure is applied to, i.e., which is according to an embodiment of the present disclosure, with reference to FIG. 2 to FIG. 13. A control target of the vehicle steering control system is a steering system; the steering system is to assist steering operation of a vehicle, and includes three systems as follows: EPS (Electric Power Steering); VGTS (Variable Gear Transmission Steering); and ARS (Active Rear Steering). Hereinafter, the systems are referred to, collectively, as an EPS+VGTS+ARS system.

EPS generates a steering assist torque which assists a steering torque of the steering wheel by the driver. VGTS changes flexibly a turning angle of a front wheel with respect to a turning angle of the steering wheel, and controls an actual steering angle of the front wheel. To be specific, the turning angle of the front wheel is set to be large in a low speed and to be small at a high speed. ARS changes flexibly a turning angle of a rear wheel with respect to a turning angle of the steering wheel, and controls an actual steering angle of the rear wheel. In the present embodiment, the electric motors are used as actuators for the three respective steering systems. The motors are referred to as an electric power steering motor, a variable gear transfer steering motor, and an active rear steering motor. In addition, hereinafter, they are referred to as an EPS motor, a VGTS motor, and an ARS motor.

Figure 2:
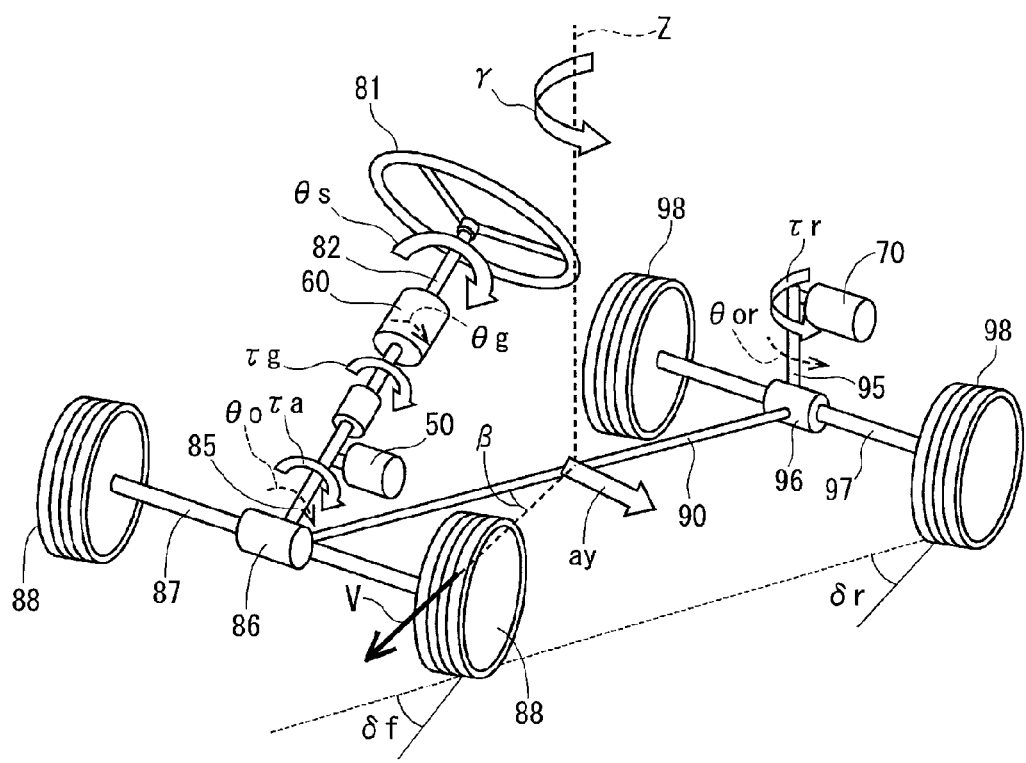
FIG. 2 is a diagram illustrating a configuration of a vehicle steering control system according to an embodiment of the present disclosure.

FIG. 2 illustrates an overall configuration of the EPS+VGTS+ARS system. The EPS+VGTS+ARS system receives a steering torque Ts by manipulation of the driver who manipulates the steering wheel 81 as an external input and turns the front wheels and rear wheels of the vehicle, eventually changing the heading direction of the vehicle. When the steering wheel 81 is manipulated, a steering shaft 82 rotates. The rotation angle of the steering shaft 82 at this time is referred to as a steering angle θs. The bottom end of the steering shaft 82 is connected to a front output axis 85, whereas the front output axis 85 is connected to a front wheel steering apparatus 86 which has a pinion gear.

Both ends of a front rack 87 are connected with the front wheels 88 via tie rods. When the pinion gear of the front wheel steering apparatus 86 rotates by rotation of the front output axis 85, a pair of front wheels 98 are steered with an angle responding to the displacement of the straight-line motion of the front rack 87. The steering angle of the front wheel 88 at this time is referred to as a front wheel actual steering angle δf. Both ends of a rear rack 97 are connected with the rear wheels 98 via tie rods. When the pinion gear of the rear wheel steering apparatus 96 rotates by rotation of the rear output axis 95, a pair of rear wheels 98 are steered with an angle responding to the displacement of the straight-line motion of the rear rack 97. The steering angle of the rear wheel 98 at this time is referred to as a rear wheel actual steering angle δr.

The EPS motor 50 gives an output torque τa to the front output axis 85 via a reduction gear (unshown). The VGTS motor 60 is provided on the axis of the steering shaft 82, and gives an output torque τg to the front output axis 85. The rotator angle of the VGTS motor 60 at this time is referred to as an angle θg, whereas the rotation angle of the front output axis 85 is referred to as an angle θo. The ARS motor 70 gives an output torque τr to the rear output axis 95 connected to the rear wheel steering apparatus 96. The rotation angle of the rear output axis 95 at this time is referred to as an angle θor.

Attention is paid to three vehicle motion properties of the steering angle θs, yaw angle velocity γ, and lateral acceleration ay with respect to the steering torque Ts, in this vehicle steering control system. This is because the three vehicle motion properties are suitable as a property for evaluating a vehicle manipulation feeling to be mentioned later. The yaw angle velocity γ is an angular velocity at which the vehicle rotates around the yaw axis z. The lateral acceleration ay is an acceleration at which the center axis 90 of the vehicle moves in the lateral direction of the vehicle. The lateral acceleration ay is dependent on a vehicle speed V, a time differential of a "sideslipping angle β of the vehicle gravity center" which is an angle formed between the heading direction and forth-and-back direction of the vehicle, and a yaw angle velocity γ.

Figure 3A:
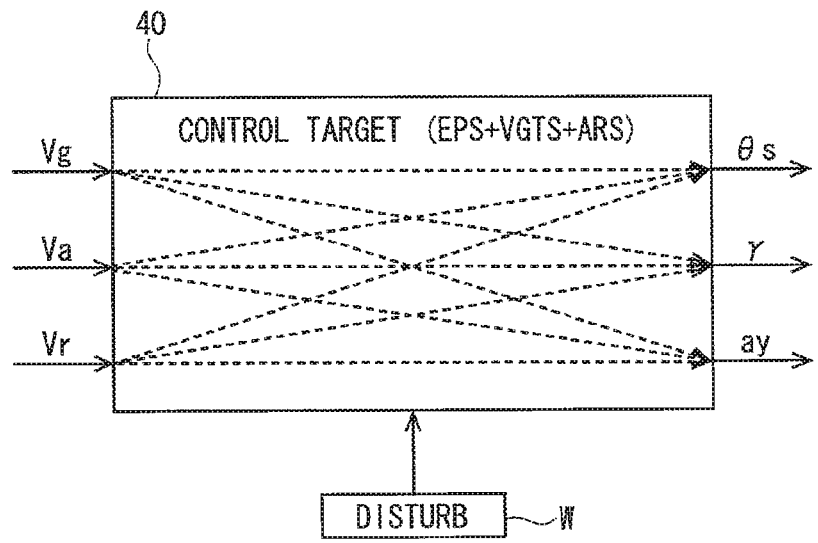
FIG. 3A is a diagram illustrating a comparative model of a conventional vehicle steering control system.

The following will study a control model illustrated in FIG. 3A; the control model includes an EPS+VGTS+ARS system as a control target 40. To be specific, the control target 40 includes an EPS motor 50, a VGTS motor 60, and an ARS motor 70, all of which are actuators for generating outputs in the EPS+VGTS+ARS system. The inputs (operation quantities) to the control target 40 are a VGTS motor voltage Vg, an EPS motor voltage Va, and an ARS motor voltage Vr; the outputs (control quantities) from the control target 40 are a steering angle θs, a yaw angle velocity γ, and a lateral acceleration ay. That is, the number of inputs and the number of outputs of the control target 40 are three inputs and three outputs (3 inputs and 3 outputs).

In this system, the output torques of the EPS motor 50, the VGTS motor 60, and the ARS motor 70 operate cooperatively to the yaw axis z; as indicated in FIG. 3A, each of the three inputs operates to the three outputs, thereby causing mutual interference. Furthermore, the vehicle receives the disturbance due to rainstorm, blown fragments, or a road surface reactive force depending on the grounding state between tires and road surfaces; the received disturbance is inputted to the control target 40.

The disturbance generally arises in any control system; it is very difficult to practically detect or presume the disturbance in real time. Therefore, it is difficult to realize theoretically a control which negates mutual interference caused by a plurality of inputs and outputs in a control system. To that end, a skilled person needs to make trial-and-error in tuning of the gain, for instance, to each of the actuators; this requires much time or many man hours.

In contrast, the vehicle steering control system according to the present embodiment indicated in FIG. 3B has mainly two features as follows. The first feature is to designate combinations of inputs and outputs of a control target 40 in a non-interference control model 35 including a non-interference controller 34 in the input side of the control target 40, and provide a non-interference control with respect to each of the designated combinations of inputs and outputs. The second feature is to provide a feedback control with respect to each of the designated combinations of the inputs and outputs. The two features negate mutual interference, which is caused in between more than one output, as much as possible; the non-interference control can be realized easily without considering the variation of the control target 40 due to the disturbance W.

Figure 4:
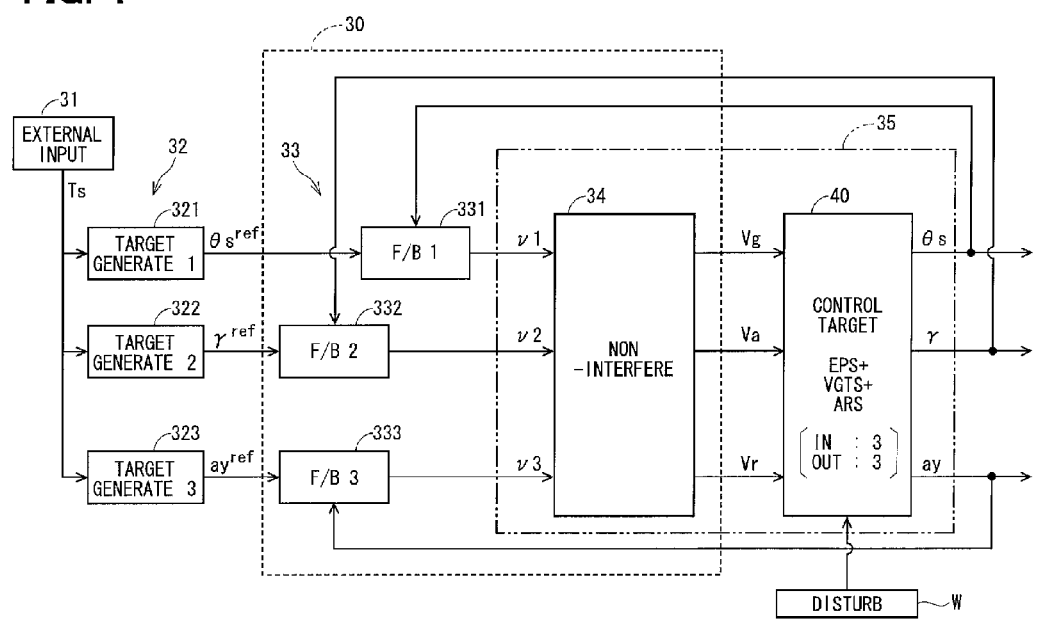
FIG. 4 is a block diagram of the vehicle steering control system according to the embodiment of the present invention.

The following will explain a configuration of the embodiment with reference to FIG. 4. A vehicle steering control system 30 of the present embodiment is indicated by the broken-line block in FIG. 4. The vehicle steering control system 30 calculates inputs to the control target 40 based on the target values which a target value generator 32 generates. Specifically, based on an external input 31 which is a steering torque Ts by a driver, the target value generator 321 generates a steering angle target value $\theta s^{ref}$, the target value generator 322 generates a yaw angle velocity target value $\gamma^{ref}$, the target value generator 323 generates a lateral acceleration target value $ay^{ref}$. The target values $\theta s^{ref}$, $\gamma^{ref}$, $ay^{ref}$ are then inputted into the vehicle steering control system 30. The target value generators 321, 322, and 323 generate target values $\theta s^{ref}$, $\gamma^{ref}$, $ay^{ref}$ with a transfer function of a secondary delay system to the steering torque Ts, for example. Thus, the target value generators 321, 322, and 323 are referred to, collectively, as the target value generator 32.

The vehicle steering control system 30 includes a feedback controller 33 and a non-interference controller 34. The feedback controller 33 calculates control inputs v1, v2, v3 to the non-interference controller 34 by PID control based on differences between the target values and the current values of the control quantities outputted from the control target 40 to make the current values follow the target values. In the present embodiment, the feedback controller 331 calculates the control input v1 from the difference ($\theta s^{ref} - \theta s$) of the steering angle; the feedback controller 332 calculates the control input v2 from the difference ($\gamma^{ref}-\gamma$) of the yaw angle velocity $\gamma$; and the feedback controller 333 calculates the control input v3 from the difference ($ay^{ref}-ay$) of the lateral acceleration ay. Thus, the feedback controllers 331, 332, 333 are referred to, collectively, as the feedback controller 33.

The non-interference controller 34 is provided in between the feedback controller 33 and the control target 40, and constitutes the non-interference control model 35 along with the control target 40. The detail of the non-interference control by the non-interference control model 35 will be explained later. The control target 40 includes a VGTS motor 60, an EPS motor 50, and an ARS motor 70. The control target 40 has three inputs and three outputs; namely, three inputs are a VGTS motor voltage Vg, an EPS motor voltage Va, and an ARS motor voltage Vr, and three outputs are a steering angle $\theta$s, a yaw angle velocity $\gamma$, and a lateral acceleration ay. The current values of the outputted control quantities $\theta$s, $\gamma$, and ay are fed back to the feedback controllers 331, 332, and 333, respectively. In addition, the disturbance W such as road surface reactive force is inputted into the control target 40.

The combinations of the inputs and the outputs are designated optionally for three inputs and three outputs. The present embodiment designates three combinations to permit the steering angle $\theta$s to be controlled by the VGTS motor voltage Vg, the yaw angle velocity $\gamma$ to be controlled by the EPS motor voltage Va, and the lateral acceleration ay to be controlled by the ARS motor voltage Vr.

The basis of designating the combinations of inputs and outputs is to permit an input to generate an output providing an advantageous effect of the control. To be specific, frequency characteristics of outputs based on respective inputs are compared to find a combination that provides a maximum gain at a noticed specific frequency. Alternatively, a combination may be found which provides a maximum integration value of a gain in a frequency region from a first frequency to a second frequency, i.e., a maximum area in a Bode diagram of the gain.

Figure 5:
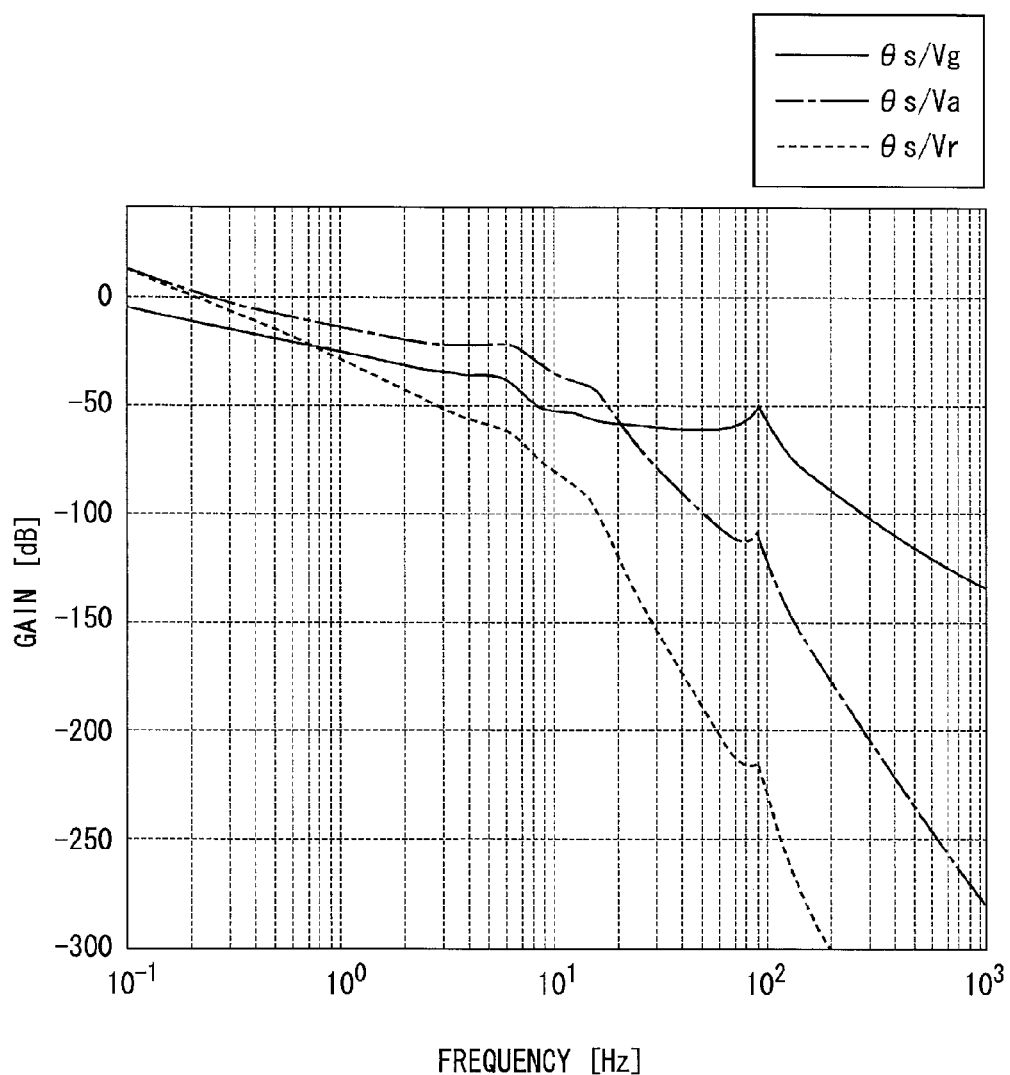
FIG. 5 is a diagram illustrating a frequency characteristic of an output of a steering angle $\theta s$ based on an input of each motor voltage before applying non-interference control.
Figure 6:
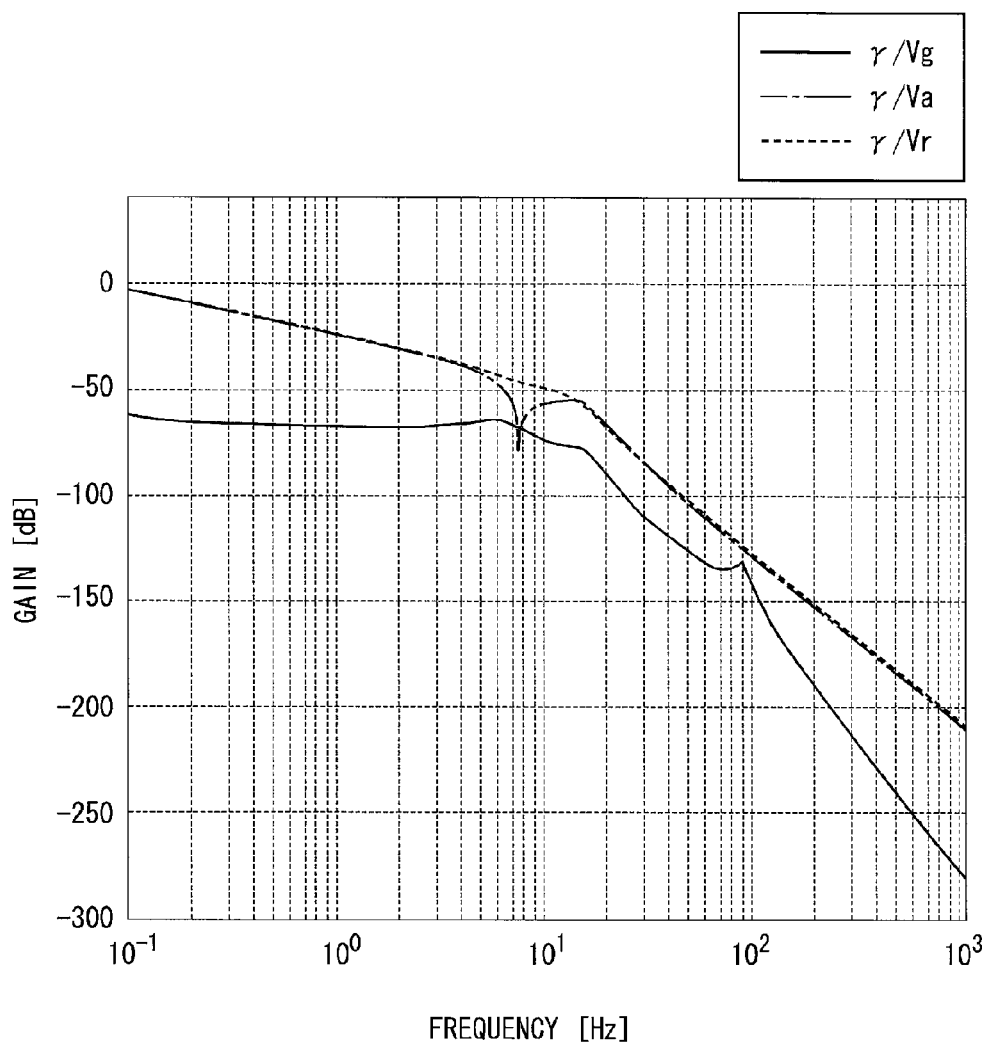
FIG. 6 is a diagram illustrating a frequency characteristic of an output of a yaw angle velocity $\gamma$ based on an input of each motor voltage before applying non-interference control.
Figure 7:
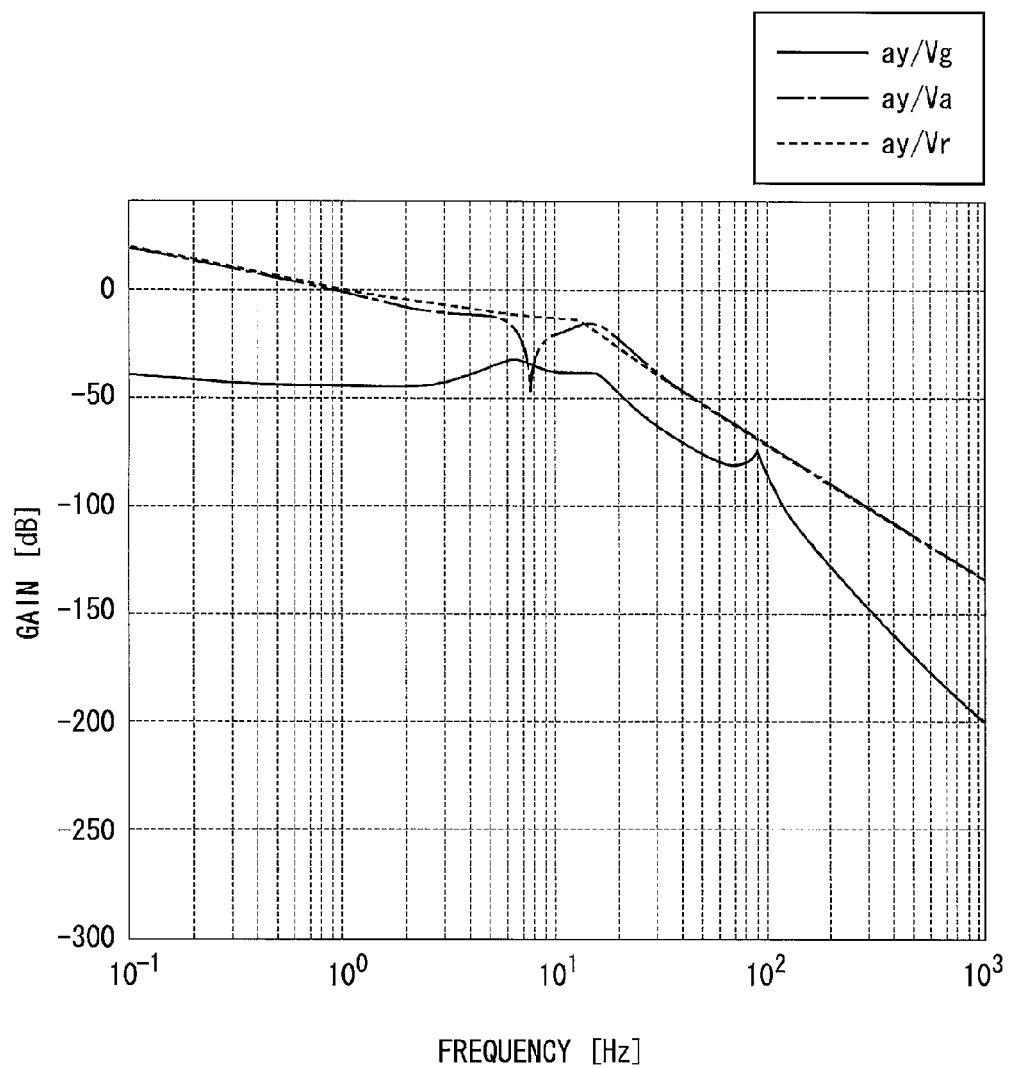
FIG. 7 is a diagram illustrating a frequency characteristic of an output of a lateral acceleration $ay$ based on an input of each motor voltage before applying non-interference control.

Reasons for designating combinations according to the present embodiment will be explained with reference to FIG. 5 to FIG. 7. In FIGS. 5 to 7, for instance, "$\theta$s/Vg" indicates a frequency characteristic of an output $\theta$s by an input Vg. With reference to FIG. 5, when the steering angle $\theta$s is controlled by the VGTS motor voltage Vg, the gain decline is minimum and the gain is maximum among three in the frequency range of 20 Hz or more. In contrast, with reference to FIG. 6 and FIG. 7, the control by the VGTS motor voltage Vg provides the yaw angle velocity $\gamma$ and the lateral acceleration ay to be minimum among three. Therefore, the combination of the VGTS motor voltage Vg and the steering angle $\theta$s may provide an advantageous effect.

Next, with reference to FIG. 6 and FIG. 7, each of the yaw angle velocity $\gamma$ and the lateral acceleration ay provides the property by the EPS motor voltage Va and the property by the ARS motor voltage Vr, two of which are similar, except that an anti-resonance property by the EPS motor voltage Va is recognized near 8 Hz. However, when seeing FIG. 7 in detail, the control from the ARS motor voltage Vr provides a gain that exceeds a gain from the control by the EPS motor voltage Va with respect to the lateral acceleration ay near 2 to 3 Hz; thus, the combination of the ARS motor voltage Vr and the lateral acceleration ay is designated. Then, the remaining combination of the EPS motor voltage Va and the yaw angle velocity $\gamma$ is designated.

Further, with reference to FIG. 5 to FIG. 7, the frequency characteristics of the outputs $\theta$s, $\gamma$, ay by the inputs Vg, Va, Vr provide gains to be partially overlapped with each other.

In particular, with reference to FIG. 6 and FIG. 7, the frequency characteristics of the outputs $\gamma$, ay by the inputs Va, Vr provide gains that are almost overlapped with each other. This indicates that the mutual interference occurs since input/output relation is not of one to one. This poses a difficulty in gain tuning in the design of the controller of each output $\theta$s, $\gamma$, ay. To that end, the present embodiment executes a non-interference control for each of the combinations of the inputs and outputs designated as mentioned above, and a feedback control for each of the combinations.

The following will explain the non-interference control specifically.

[Derivation of State Space Model]

Expression 1 (1.1, 1.2) provides a general form of an equation of state about the control target 40. It is noted that the design of the non-interference controller neglects "DTs" term of the right side of Expression 1.1 that is a term concerning the steering torque Ts by the driver. This is because the number of inputs and the number of outputs need to be identical for applying the theory of the non-interference control.

[Expression 1]

$$\begin{cases} \dot{x} = Ax + Bu + DTs & (1.1) \\ y = Cx & (1.2) \end{cases}$$

The number of inputs and the number of outputs of the control target 40 are 3 inputs and 3 outputs as above-mentioned; thus, the input u is expressed with a column vector of Expression 2 and the output y is expressed with a column vector of Expression 3.

[Expression 2]

$$u = \begin{bmatrix} u_1 \\ u_2 \\ u_3 \end{bmatrix} = \begin{bmatrix} V_g \\ V_a \\ V_r \end{bmatrix} \quad (2)$$

[Expression 3]

$$y = \begin{bmatrix} \theta_s \\ \gamma \\ a_y \end{bmatrix} \quad (3)$$

With respect to the state variable x, the EPS+VGTS+ARS system is divided into (i) the EPS+VGTS system for the front wheel, and (ii) the ARS system for the rear wheel, and the equation of motion between each steering motor and a rotation load is analyzed; this extracts variables which affects the output. The detailed explanation of the equation of motion is omitted. As a result of the analysis, the state variable vector x is expressed by a combination vector of 15 elements which combines "a state vector xp of six elements", "a state vector of time differentials of six elements of the state vector xp", and "a state vector i of three elements relating to motor current".

The state vector xp, which is a partial vector of the state variable vector x, and its time differential are indicated as Expression 4.1 and Expression 4.2. The elements of the state vector xp are as follows.

$\theta$s: Steering wheel angle
$\theta$g: VGTS motor rotor angle
$\theta$o: Rotation angle of front output axis 85

θor: Rotation angle of rear output axis 95
β: Sideslipping angle of vehicle gravity center
γ: Yaw angle velocity

[Expression 4]

$$x_p = \begin{bmatrix} \theta_s \\ \theta_g \\ \theta_o \\ \theta_{or} \\ \beta \\ \gamma \end{bmatrix}, \quad (4.1)$$

$$\dot{x}_p = \begin{bmatrix} \dot{\theta}_s \\ \dot{\theta}_g \\ \dot{\theta}_o \\ \dot{\theta}_{or} \\ \dot{\beta} \\ \dot{\gamma} \end{bmatrix} \quad (4.2)$$

In addition, the state vector i concerning motor current is indicated as Expression 5. The elements of the state vector i are as follows.
ig: VGTS motor current
ia: EPS motor current
ir: ARS motor current

[Expression 5]

$$i = \begin{bmatrix} i_g \\ i_a \\ i_r \end{bmatrix} \quad (5)$$

The state variable vector xp is indicated as Expression 6.

[Expression 6]

$$x = \begin{bmatrix} x_p \\ \dot{x}_p \\ i \end{bmatrix} \quad (6)$$

Expressions 1.1 and 1.2 are replaced by Expressions 7.1 and 7.2 from Expressions 2 to 6. DTs term is disregarded in Expression 7.1; Expression 7.1 does not include DTs.

[Expression 7]

$$\begin{cases} \begin{bmatrix} \dot{x}_p \\ \ddot{x}_p \\ \dot{i} \end{bmatrix} = A \begin{bmatrix} x_p \\ \dot{x}_p \\ i \end{bmatrix} + B \begin{bmatrix} V_g \\ V_a \\ V_r \end{bmatrix} & (7.1) \\ \begin{bmatrix} \theta_s \\ \gamma \\ a_y \end{bmatrix} = C \begin{bmatrix} x_p \\ \dot{x}_p \\ i \end{bmatrix} & (7.2) \end{cases}$$

Each of a matrix A and a matrix B, which consists of constant elements, is explained briefly. The matrix A includes constants with respect to elements concerning secondary differential of vector xp, such as a moment of inertia of a motor and a rotation load, a torque constant, a viscous friction coefficient of a component member, and a speed reduction ratio. In addition, the matrix A includes constants with respect to elements concerning time differential of the vector i, such as a reactance and resistance of each motor. The matrix B includes constants with respect to elements concerning time differential of the vector i, such as a reactance and resistance of each motor.

In contrast, a matrix C of an output equation has three rows and fifteen columns as indicated as Expression 8.

[Expression 8]

$$C = \begin{bmatrix} 1 & 0 & 0 & 0 & 0 & 0 & | & 0 & 0 & 0 & 0 & 0 & 0 & | & 0 & 0 & 0 \\ 0 & 0 & 0 & 0 & 0 & 1 & | & 0 & 0 & 0 & 0 & 0 & 0 & | & 0 & 0 & 0 \\ 0 & 0 & 0 & 0 & 0 & V & | & 0 & 0 & 0 & 0 & V & 0 & | & 0 & 0 & 0 \end{bmatrix} \quad (8)$$

The third row vector of the matrix C reflects Expression 9 about a lateral acceleration ay. In Expression 9, V is a vehicle speed.

[Expression 9]

$$a_y = V(\dot{\beta} + \gamma) \quad (9)$$

[Design of Non-Interference Controller]

Figure 3B:
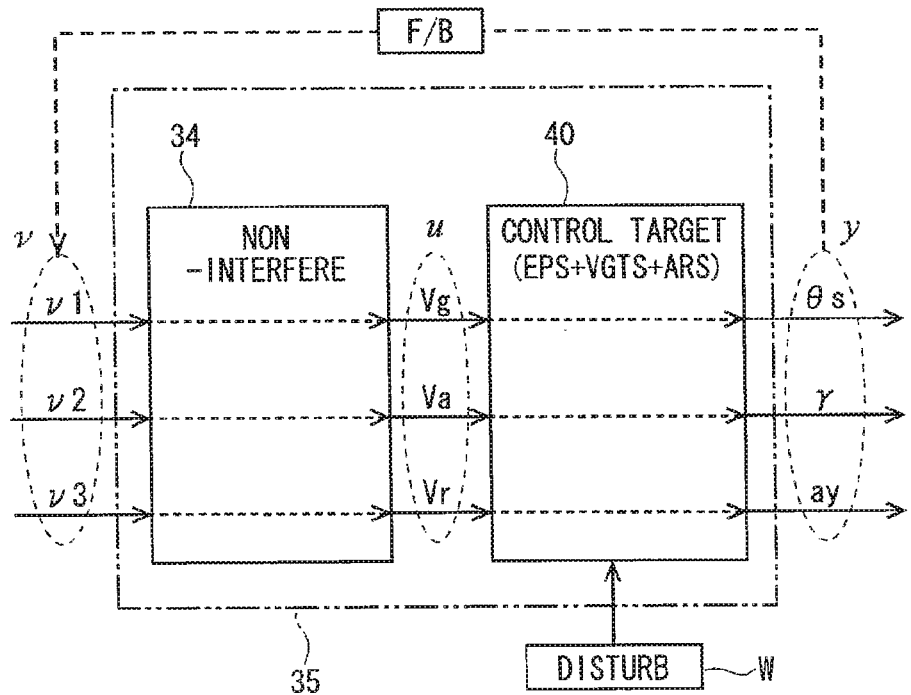
FIG. 3B is a diagram illustrating a model of the vehicle steering control system according to the embodiment.

Now, state feedback is applied to the non-interference control model 35 in FIG. 3B and FIG. 4 with Expression 10.

[Expression 10]

$$u = Fx + Gv \quad (10)$$

Here, v is a control input to the non-interference controller 34, and consists of three elements (v1, v2, v3). In contrast, u is an output of the non-interference controller 34, and an input to the control target 40 while consisting of three elements (Vg, Va, Vr). G is a gain from v to u, and F is a state feedback gain in the non-interference controller 34. The non-interference controller 34 is designed, with respect to the relation between the control inputs v1, v2, v3, and outputs θs, γ, ay of the control target 40, such that v1 affects only θs, v2 affects only γ, and v3 affects only ay.

Expression 10 is assigned to Expression 1.1; this obtains Expression 11 which is an equation of state after non-interference. It is noted that, as mentioned above, DTs term is disregarded and is not described.

[Expression 11]

$$\begin{aligned} \dot{x} &= Ax + Bu \\ &= Ax + B(Fx + Gv) \\ &= (A + BF)x + BGv \end{aligned} \quad (11)$$

When Expression 11 and Expression 1.2 are subjected to Laplace transform, a transfer function $H_{FG}$ after the non-interference is indicated with Expression 12.1. In addition, since the number of inputs is three (m=3), the transfer function $H_{FG}(s)$ is indicated with a matrix with three rows and three columns as indicated in Expression 12.2. This matrix is a diagonal matrix, in which the element of the row i and the column j is (i) zero when i≠j, and (ii) an inverse number of σ-order polynomial of Laplace transform s when i=j. In addition, regarding the order σ of s, σ1=3 at a polynomial with the first row and the first column; σ2=4 at a polynomial with the second row and the second column;

and σ3=3 at a polynomial with the third row and the third column. The explanation about the derivation is omitted.

[Expression 12]

$$H_{FG}(s) = C(sI - A - BF)^{-1}BG \quad (12.1)$$

$$= \begin{bmatrix} \dfrac{1}{s^3 + \alpha_{11}s^2 + \alpha_{12}s + \alpha_{13}} & 0 & 0 \\ 0 & \dfrac{1}{s^4 + \alpha_{21}s^3 + \alpha_{22}s^2 + \alpha_{23}s + \alpha_{24}} & 0 \\ 0 & 0 & \dfrac{1}{s^3 + \alpha_{31}s^2 + \alpha_{32}s + \alpha_{33}} \end{bmatrix} \quad (12.2)$$

In order to apply non-interference control to the non-interference control model 35, the gain G and the status feedback gain F only need to be designated as Expression 13.1 and Expression 13.2, respectively.

[Expression 13]

$$\begin{cases} G = B^{*-1} & (13.1) \\ F = -G \begin{bmatrix} c_1^T A^3 + \alpha_{11} c_1^T A^2 + \alpha_{12} c_1^T A + \alpha_{13} c_1^T \\ c_2^T A^4 + \alpha_{21} c_2^T A^3 + \alpha_{22} c_2^T A^2 + \alpha_{23} c_2^T A + \alpha_{24} c_2^T \\ c_3^T A^3 + \alpha_{31} c_3^T A^2 + \alpha_{32} c_3^T A + \alpha_{33} c_3^T \end{bmatrix} & (13.2) \end{cases}$$

$c_i^T$ (i=1, 2, 3) is equivalent to the i-th row vector of the matrix C (Expression 8), and is indicated with Expression 14.1 to 14.3.

[Expression 14]

$$\begin{cases} c_1^T = [1 \ 0 \ 0 \ 0 \ 0 \ 0 \ | \ 0 \ 0 \ 0 \ 0 \ 0 \ 0 \ | \ 0 \ 0 \ 0] & (14.1) \\ c_2^T = [0 \ 0 \ 0 \ 0 \ 0 \ 1 \ | \ 0 \ 0 \ 0 \ 0 \ 0 \ 0 \ | \ 0 \ 0 \ 0] & (14.2) \\ c_3^T = [0 \ 0 \ 0 \ 0 \ 0 \ V \ | \ 0 \ 0 \ 0 \ 0 \ V \ 0 \ | \ 0 \ 0 \ 0] & (14.3) \end{cases}$$

Expression 13.1 indicates that G is an inverse matrix of adjoint matrix (conjugate transposed matrix) B* of B. It is premised to obtain G that an inverse matrix exists in B* and B* is regular. Although the calculation is omitted, in the present embodiment, it is confirmed that B* is regular.

The following designs coefficients $\alpha_{11}$ to $\alpha_{33}$ of the denominator polynomials of Expression 13.2. It is supposed that the poles of three denominator polynomials are (-pk1), (-pk2), and (-pk3); Expression 12.2 is rewritten into Expression 15. Now, the transfer function $H_{FG}(s)$ after non-interference is obtained; a suitable frequency is applied to (-pk1), (-pk2), and (-pk3), to verify the non-interference using the transfer function $H_{FG}(s)$.

[Expression 15]

$$H_{FG}(s) = \begin{bmatrix} \dfrac{1}{(s+pk_1)^3} & 0 & 0 \\ 0 & \dfrac{1}{(s+pk_2)^4} & 0 \\ 0 & 0 & \dfrac{1}{(s+pk_3)^3} \end{bmatrix} \quad (15)$$

Figure 8:
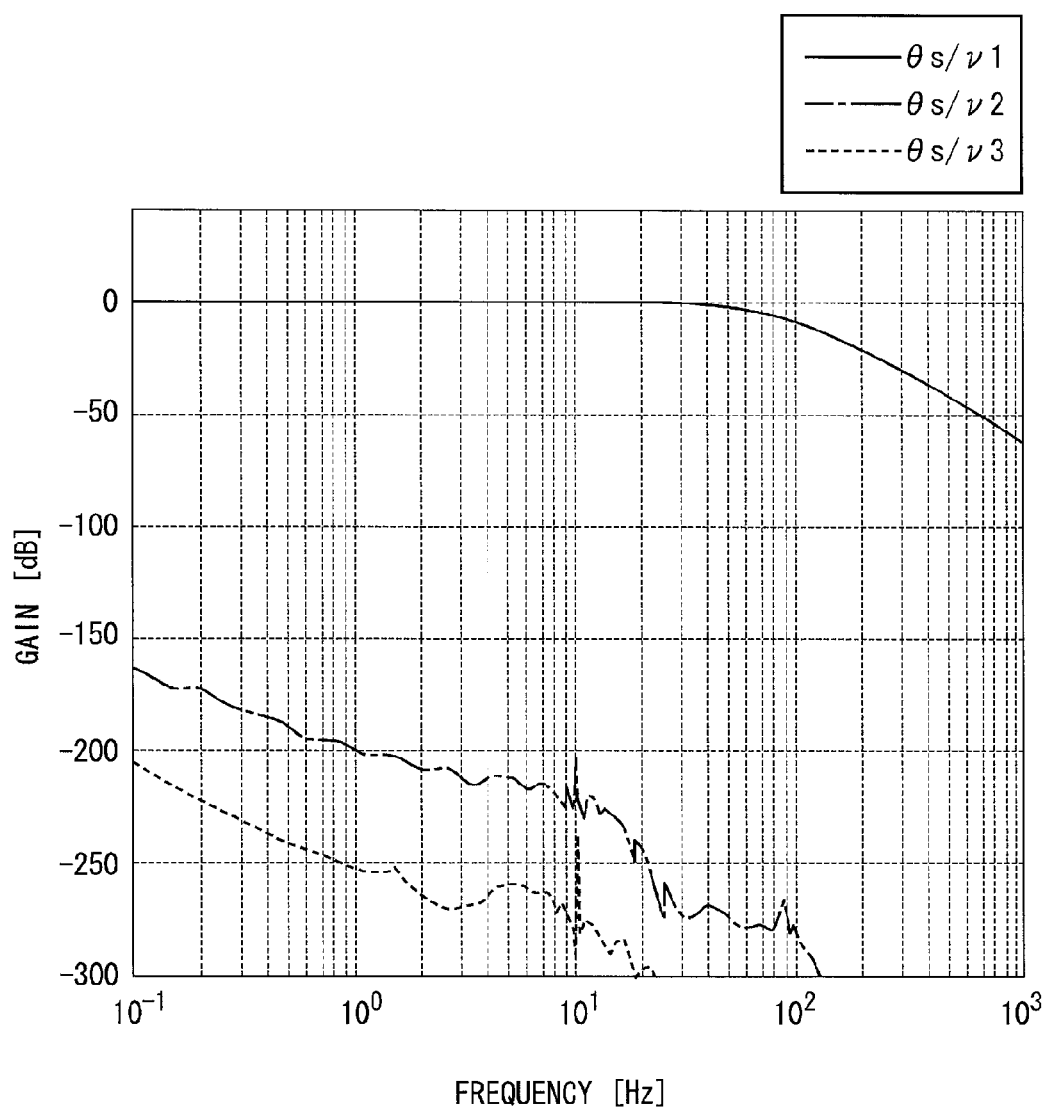
FIG. 8 is a diagram illustrating a frequency characteristic of an output of a steering angle $\theta s$ based on an input of each motor voltage after applying non-interference control.
Figure 9:
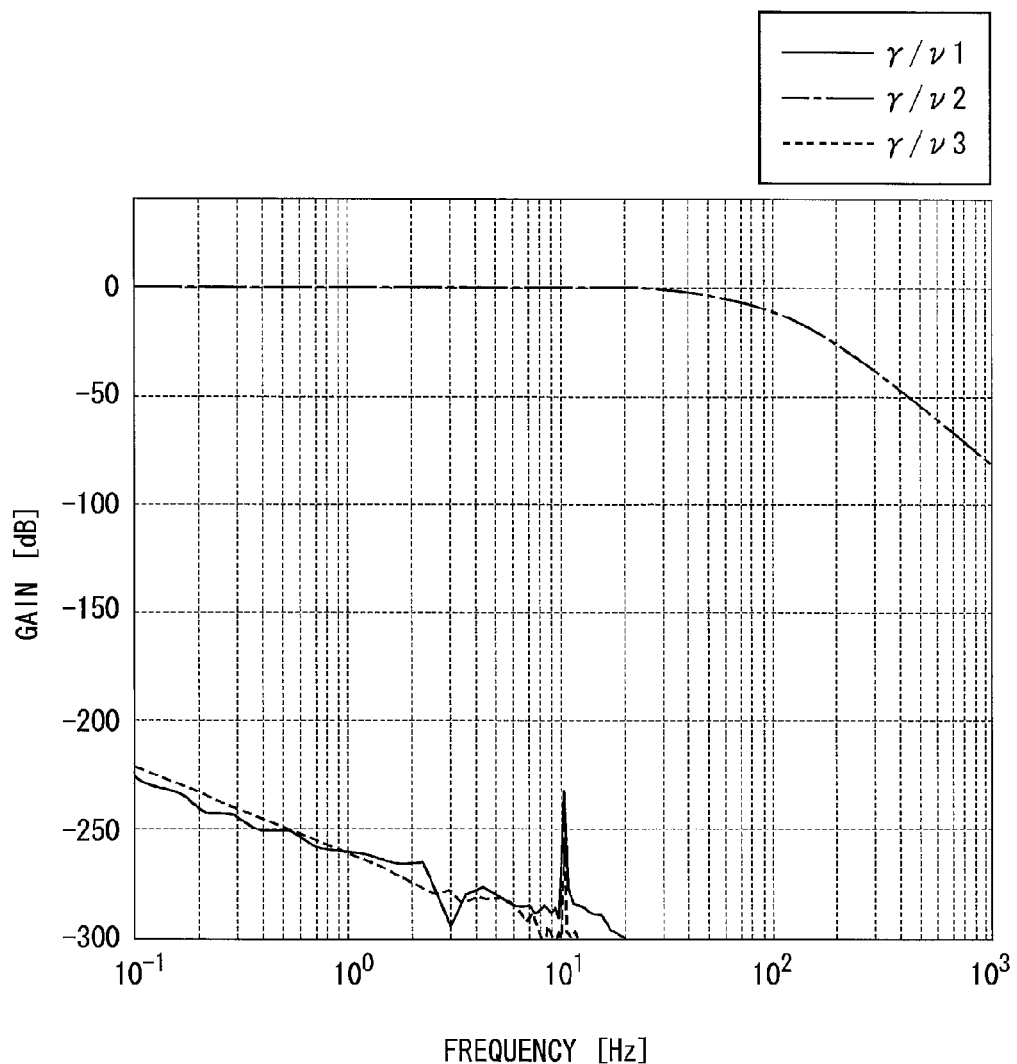
FIG. 9 is a diagram illustrating a frequency characteristic of an output of a yaw angle velocity γ based on an input of each motor voltage after applying non-interference control.
Figure 10:
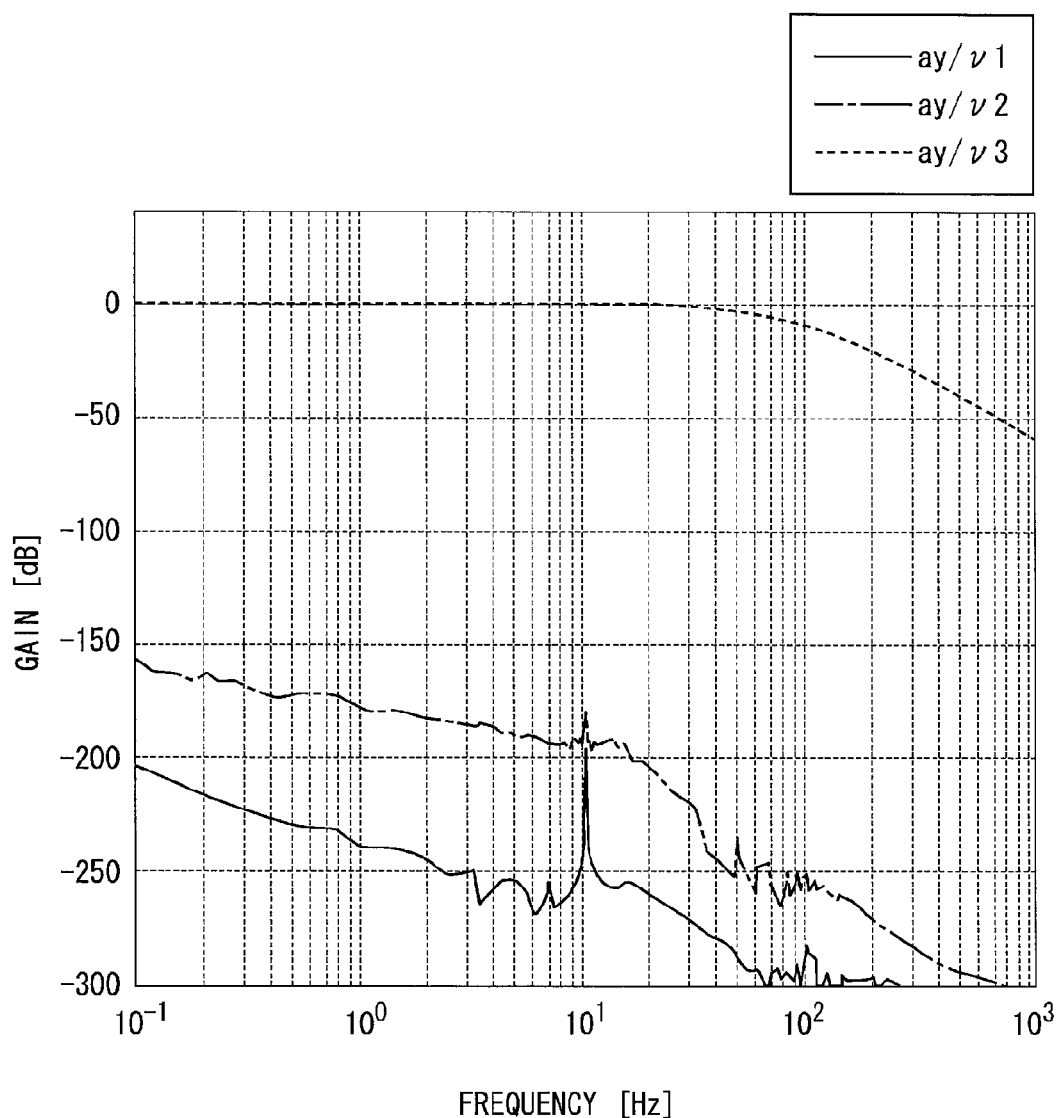
FIG. 10 is a diagram illustrating a frequency characteristic of an output of a lateral acceleration ay based on an input of each motor voltage after applying non-interference control.

The non-interference control model 35, which the above-mentioned non-interference control is applied to, provides frequency characteristics from the control inputs v1, v2, v3 to the outputs θs, γ, ay, as indicated in FIG. 8 to FIG. 10, wherein "θs/v1" indicates a frequency characteristic of the output θs by the control input v1. FIG. 8 indicates that the gain by the control input v1 is high over the whole of frequencies, with respect to the steering angle θs. FIG. 9 indicates that the gain by the control input v2 is high over the whole of frequencies, with respect to the yaw angle velocity γ. FIG. 10 indicates that the gain by the control input v3 is high over the whole of frequencies, with respect to the lateral acceleration ay. This proves that non-interference is achieved.

As mentioned above, the vehicle steering control system 30 according to the present embodiment applies non-interference control to each of designated combinations of the inputs and outputs, thereby permitting the control inputs v1, v2, v3 of the non-interference controller 34 to affect the outputs θs, γ, ay, respectively. That is, the control input v1 is permitted to affect only the output θs; the control input v2 is permitted to affect only the output γ; and the control input v3 is permitted to affect only the output ay. This facilitates the independent control of each of three vehicle motion properties of the steering angle θs, the yaw angle velocity γ, and the lateral acceleration ay, with respect to the steering torque Ts. In addition, the feedback control may be applied to each of the designated combinations; this negates an error between the non-interference control term and the control target 40 to amend a mutual interference term automatically. Therefore, the non-interference control can be realized easily without considering the variation of the control target 40 due to the disturbance W.

Thus, the vehicle steering control system 30 according to the present embodiment may control independently each of three vehicle motion properties of the steering angle θs, the yaw angle velocity γ, and the lateral acceleration ay, with respect to the steering torque Ts. The following will explain an operation feeling evaluation of the vehicle using the above advantageous effect.

In the target value generators 321, 322, 323 in FIG. 4, target values $\theta s^{ref}$, $\gamma^{ref}$, $ay^{ref}$ of the steering angle, yaw angle velocity, and lateral acceleration with respect to the steering torque Ts are generated by using the transfer function (Expression 16) of the secondary delay system to the steering torque Ts, for instance. In Expression 16, K represents a proportionality coefficient; $\omega_n$ represents a natural angular frequency; and ζ represents an attenuation coefficient.

[Expression 16]

$$G(s)^{ref} = \frac{K\omega_n^2}{s^2 + 2\zeta\omega_n s + \omega_n^2} \quad (16)$$

The use of the transfer function of the secondary delay system permits convergence values of the step response waveforms to come to target values $\theta s^{ref}$, $\gamma^{ref}$, $ay^{ref}$. In addition, the overshooting Os (%) and the excessive time Tp can be calculated with Expressions 17, 18.

[Expression 17]

$$O_s = 100 \, e^{\frac{-\zeta\pi}{\sqrt{1-\zeta^2}}} \qquad (17)$$

[Expression 18]

$$Tp = \frac{\pi}{\omega_n \sqrt{1-\zeta^2}} \qquad (18)$$

Figure 11:
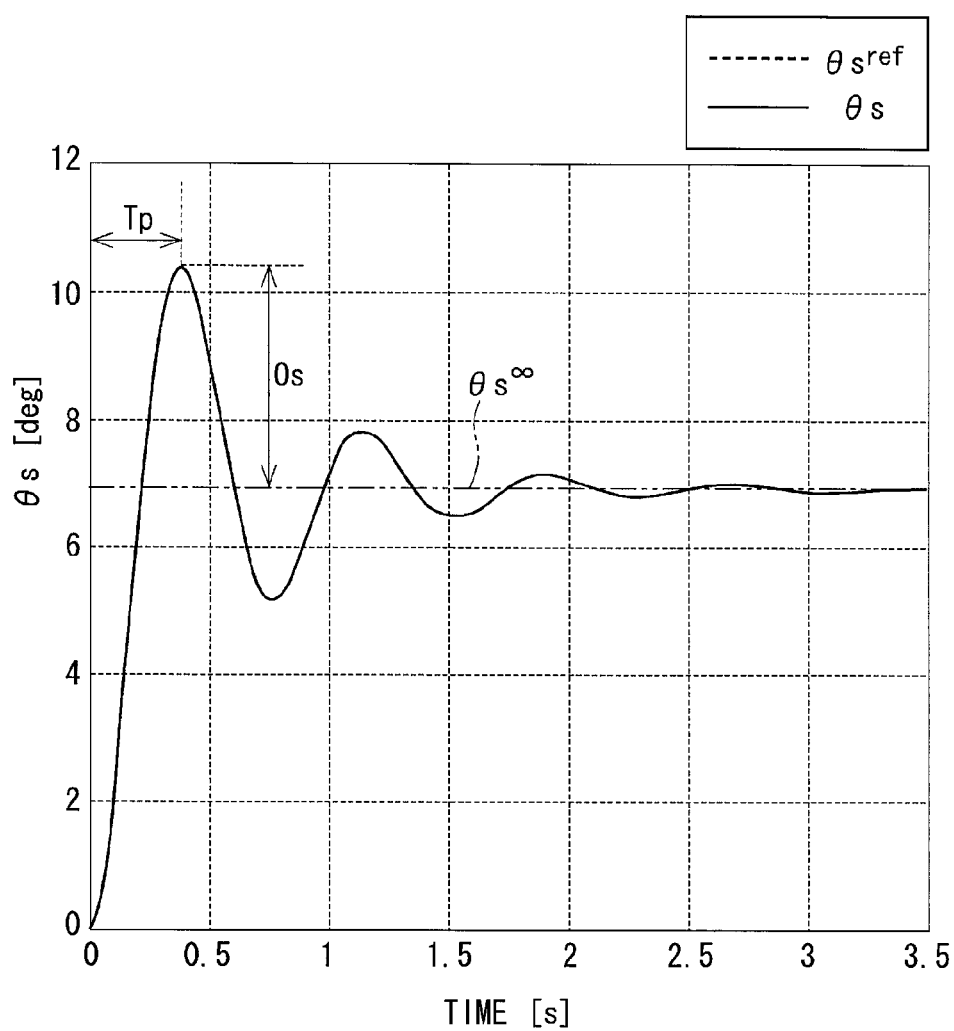
FIG. 11 is a diagram illustrating a wave form indicating a target value following characteristic of a steering angle θs by the non-interference controller.
Figure 12:
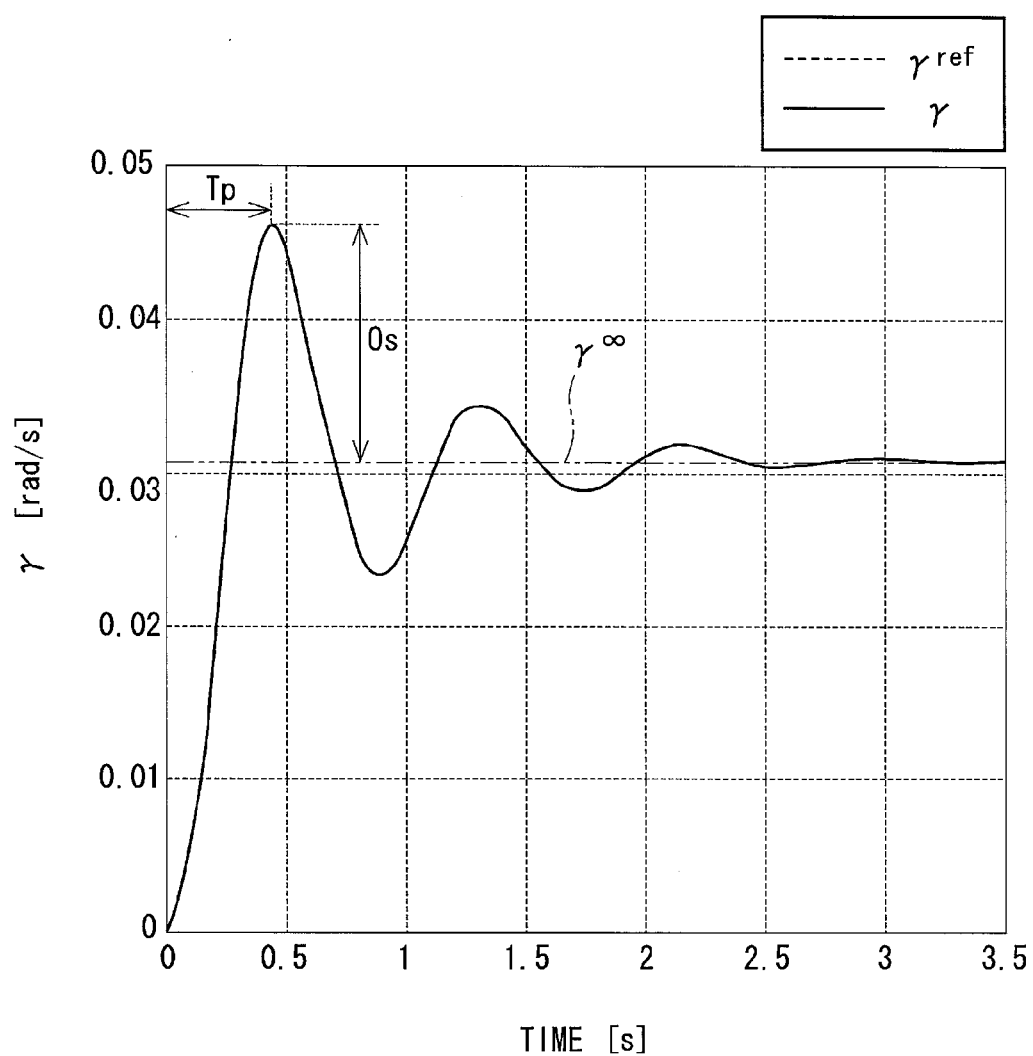
FIG. 12 is a diagram illustrating a wave form indicating a target value following characteristic of a yaw angle velocity γ by the non-interference controller.
Figure 13:
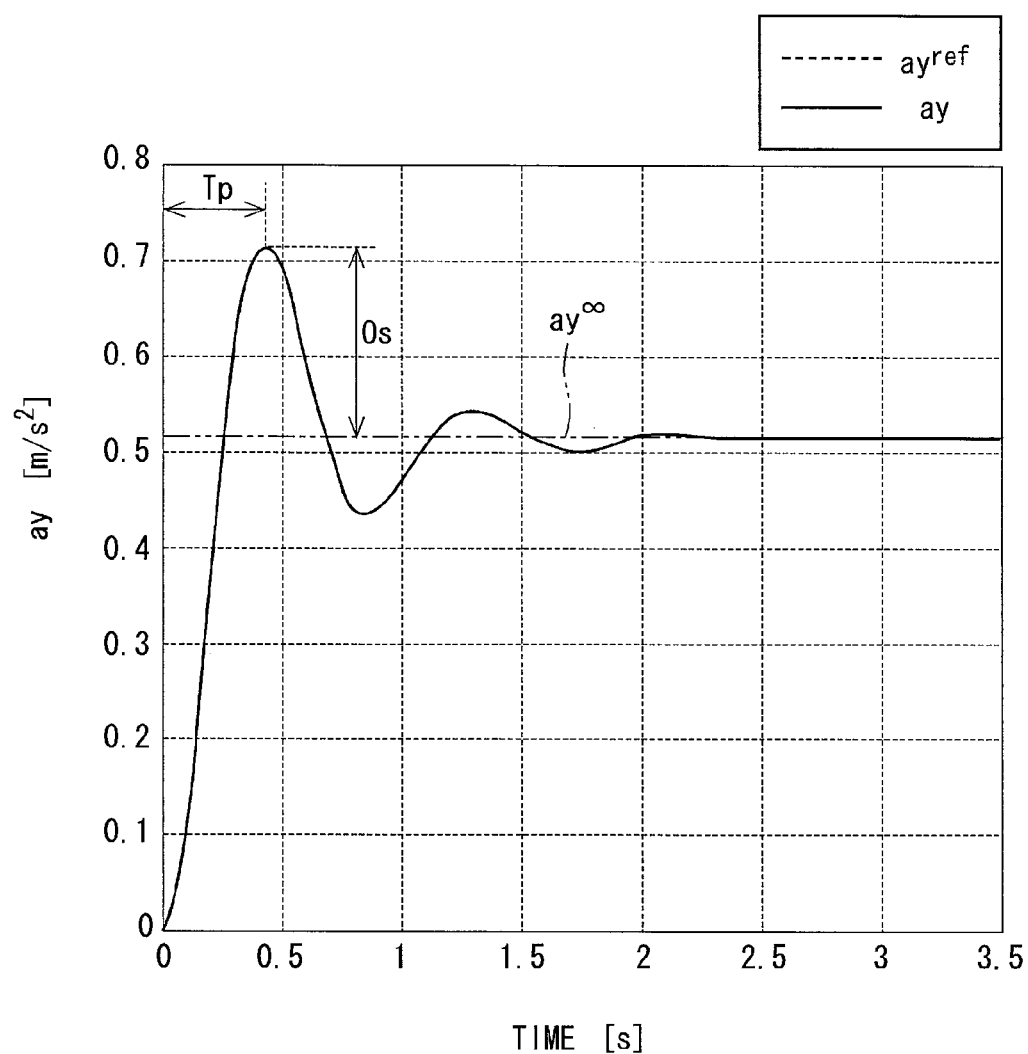
FIG. 13 is a diagram illustrating a wave form indicating a target value following characteristic of a lateral acceleration ay by the non-interference controller.

The coefficients K, $\omega_n$, $\zeta$ of the transfer function in Expressions 16 to 18 are estimated as follows. The waveforms of $\theta s$, $\gamma$, ay, which are obtained by simulating the coefficients K, $\omega_n$, $\zeta$, are subjected to the curve fitting against the respective step response waveforms of properties $\theta s$, $\gamma$, ay in a base vehicle as a standard. FIG. 11 to FIG. 13 illustrate the step response waveforms of $\theta s$, $\gamma$, ay which are obtained as explained above, and the following properties of the outputs $\theta s$, $\gamma$, ay obtained using the non-interference controller 34. The target value and the line of the following property of the output overlap with each other on the waveform with respect to each of the steering angle $\theta s$ in FIG. 11, the yaw angle velocity $\gamma$ in FIG. 12, and the lateral acceleration ay in FIG. 13; this proves that the outputs follow well the target values $\theta s^{ref}$, $\gamma^{ref}$, $ay^{ref}$, respectively.

Generally the step response waveform is suitable for evaluation of a transient characteristic of a system. Thus, in evaluating an operation feeling at the time of manipulating the steering wheel, the attenuation characteristic or response characteristic of the step response waveform is evaluated; thereby, the driver's sensibility of manipulating the steering wheel repeatedly in the state changing every moment can be evaluated quantitatively. To be specific, the present embodiment changes independently the overshooting Os and the excessive time Tp of the step response waveform; this changes the vehicle motion property easily and confirms the influence on operation feeling. This achieves a quantitative evaluation of the operation feeling easily as compared with a conventional evaluation using Lissajous waveform.

Other Embodiments (a) Combinations of the inputs and outputs designated in the vehicle steering control system 30 may not be limited to the combinations of "VGTS motor voltage Vg and steering angle $\theta$", "EPS motor voltage Va and yaw angle velocity $\gamma$", and "ARS motor voltage Vr and lateral acceleration ay" that were adopted in the above embodiment. For example, the frequency characteristics of the output of the yaw angle velocity $\gamma$ to the inputs of the EPS motor voltage Va and the ARS motor voltage Vr do not provide a significant difference between them (refer to FIG. 6). Further, the frequency characteristics of the output of the lateral acceleration ay to the inputs of the EPS motor voltage Va and the ARS motor voltage Vr do not provide a significant difference between them (refer to FIG. 7). Thus, the combinations of "EPS motor voltage Va and lateral acceleration ay", and "ARS motor voltage Vr and the yaw angle velocity $\gamma$" may be designated alternatively.

(b) The actuators to generate the outputs in the EPS+VGTS+ARS system may be not limited to the electric motors but be other actuators to output rotation power or linear power.

(c) The control system according to the present disclosure may not be limited to the vehicle steering control system but be any control system which controls any physical quantity such as temperature, pressure, position. In addition, the number m of the inputs and the number n of the outputs of the control target may not be limited to m=n=3 but be m=n (≥2) when the mutual interference may occur between n outputs.

(d) Furthermore, even when the number m of the inputs and the number n of the outputs of the control target are m≠n, the control system according to the present disclosure may be applicable. For example, the technique of the present disclosure may be applied to the case that the number of the inputs is different from the number of the outputs by using the technique described in the following reference document.

REFERENCE DOCUMENT

"The multi-stage non-interference method by series parallel connection of predistorters", Assignment number 14550455, Grants-in-aid for scientific research in the fiscal years of Heisei 14 (2002) and Heisei 15 (2003), (Basic research (C), (2)), Result of research report, published in December Heisei 16 (2004)

Figure 14:
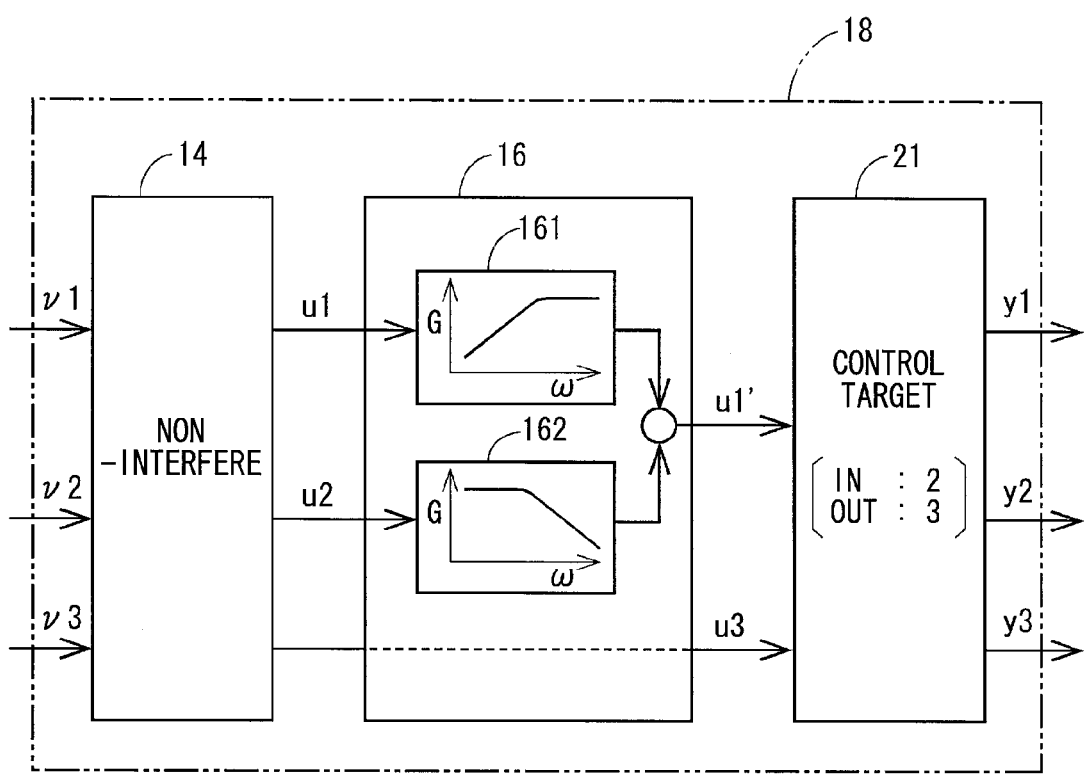
FIG. 14 is a block diagram illustrating a vehicle steering control system including a control target having m inputs and n outputs (m<n) according to an embodiment of the present disclosure.
Figure 15:
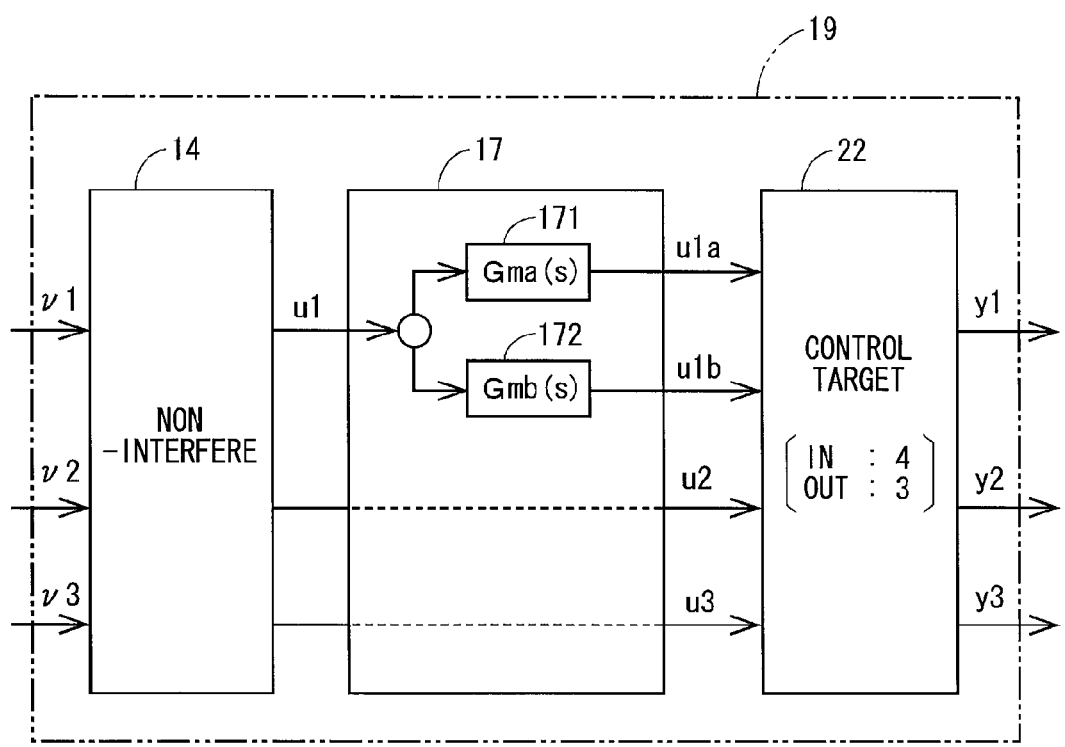
FIG. 15 is a block diagram illustrating a vehicle steering control system including a control target having m inputs and n outputs (m>n) according to an embodiment of the present disclosure.

FIG. 14 indicates an example where the number m of inputs and the number n of outputs of a control target 21 are two and three, i.e., "m<n." In FIG. 14 and FIG. 15, a substantively identical element or configuration is assigned with an identical reference number; the duplicated explanation is omitted. FIG. 14 indicates a non-interference control model 18 that includes an input expander 16 of "multi inputs and 1 output" in between a non-interference controller 14 and a control target 21. two inputs u1, u2 among the inputs u1, u2, u3 having undergone the non-interference control by the non-interference controller 14 are adopted in an alternative way by the input expander 16 depending on a frequency range to be integrated into one input u1'. To be specific, when the input u1 passes through a highpass filter 161, the low frequency band lower than the cutoff frequency is cut; when the input u2 passes through a lowpass filter 162, the high frequency band higher than the cutoff frequency is cut. The input u3 is inputted into the control target 21 as it is. The control target 21 outputs three outputs y1, y2, y3 based on the two inputs u1' and u3.

Thus, the configuration where the number m of the inputs and the number m of the outputs of the control target 21 have a relation of "m<n" is supposed to provide a type different from that of "m=n". However, in another view, an "expansion unit" may be provided by integrating the input expander 16 and the control target 21. This expansion unit provides the number m* of inputs and the number n of the outputs to be three and three, respectively. Therefore, according to this view, the configuration in FIG. 14 may be a type to provide an expansion unit at the output side of the non-interference controller 14, the expansion unit being with the numbers m*, n of the inputs and outputs being m*=n, by replacing the control target with m=n.

(e) In addition, FIG. 15 indicates a non-interference control model 19 where the numbers m, n of the inputs and the outputs of a control target 22 are four and three, respectively, namely "m>n." In addition, an input expander 17 with one input and multiple outputs is provided in between the non-interference controller 14 and the control target 22. The input u1 is divided into two by the input expander 17. One is inputted into the control target 22 as an input u1a via a controller 171; the other is inputted into the control target 22 as an input u1b via a controller 172. Inputs u2, u3 are inputted into the control target 22 as they are. The control target 22 outputs three outputs y1, y2, y3 based on the four inputs u1a, u1b, u2, u3.

This configuration may be considered, like that of (d), as a type different from the control target with the numbers of the inputs and the outputs having a relation of m=n. Alternatively, one expansion unit with the numbers m*, n of the inputs and outputs having a relation of "m*=n."

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle steering control system for a vehicle, comprising:
a steering system as a control target, configured to receive a plurality of m inputs and provide a plurality of n outputs based on the plurality of m inputs received, wherein each of m and n is a natural number that is more than one, m being equal to n, the plurality of m inputs including operation quantities, the plurality of n outputs including control quantities;
a plurality of feedback controllers, each of which is configured to calculate an operation quantity of the operation quantities based on a difference between (i) a target value, which is generated by a target value generator, the target value corresponding to a control quantity of the control quantities, and (ii) a current value of an output of the plurality of n outputs provided by the control target; and
a non-interference controller provided between (i) the plurality of feedback controllers and (ii) the control target, the non-interference controller being configured to execute a non-interference control to reduce influence due to mutual interference between the outputs provided by the control target,
wherein:
the plurality of n outputs provided by the control target include three control quantities that are (i) a steering angle, (ii) a yaw angle velocity, and (iii) a lateral acceleration, the three control quantities being vehicle properties of vehicle motions generated based on a driver's steering torque;
a plurality of combinations of the plurality of m inputs and the plurality of n outputs in the control target are designated by the vehicle steering control system; and
the non-interference control by the non-interference controller and the feedback control by the feedback controllers are configured to be executed with respect to each of the designated combinations of the plurality of m inputs and the plurality of n outputs,
wherein:
the control target includes a variable gear transfer steering motor which controls an actual steering angle of a front wheel, while one of the designated combinations is of (i) a motor voltage of the variable gear transfer steering motor that serves as one of the plurality of m inputs and (ii) the steering angle of the vehicle that serves as one of the plurality of n outputs;
the control target includes an electric power steering motor which assists a steering force by a driver, while one of the designated combinations is of (i) a motor voltage of the electric power steering motor that serves as one of the plurality of m inputs and (ii) the yaw angle velocity of the vehicle that serves as one of the plurality of n outputs; and
the control target includes an active rear steering motor which controls an actual steering angle of a rear wheel, while one of the designated combinations is of (i) a motor voltage of the active rear steering motor that serves as one of the plurality of m inputs and (ii) the lateral acceleration of the vehicle that serves as one of the plurality of n outputs.

2. The vehicle steering control system according to claim 1, wherein:
the operation quantities are instructed voltages to actuators that drive the vehicle motions, whereas the control quantities are the vehicle properties of the vehicle motions; and
each combination among the designated combinations is of
(i) one input among the plurality of m inputs serving as the instructed voltages to actuators and
(ii) one output among the plurality of n outputs serving as the vehicle properties of the vehicle motions.

3. The vehicle steering control system according to claim 1, wherein:
the number of the designated combinations is more than one and equal to n being the number of the plurality of n outputs, and thus equal to m being the number of the plurality of m inputs.

4. A vehicle steering control system for a vehicle, comprising:
a steering system as a control target that is configured to receive a plurality of m inputs and provide a plurality of n outputs based on the plurality of m inputs received, wherein each of m and n is a natural number that is more than one, m being equal to n, the plurality of m inputs including operation quantities, the plurality of n outputs including control quantities, the m inputs includes all inputs of the control target, and the n outputs includes all outputs of the control target;
a plurality of feedback controllers, each of which is configured to calculate an operation quantity of the operation quantities based on a difference between (i) a target value, which is generated by a target value generator, the target value corresponding to a control quantity of the control quantities, and (ii) a concurrent value of an output of the plurality of n outputs provided by the control target; and
a non-interference controller provided between (i) the plurality of feedback controllers and (ii) the control target, the non-interference controller being configured to execute a non-interference control to reduce influence due to mutual interference between the outputs provided by the control target,
wherein:
a plurality of combinations of the plurality of m inputs and the plurality of n outputs in the control target are designated by the vehicle steering control system, the operation quantities of the plurality of m inputs being instructed voltages to actuators that drive vehicle motions, the control quantities of the plurality of n outputs being vehicle properties of vehicle motions;
each combination among the designated plurality of combinations is of (i) one input among the plurality of m inputs serving as the instructed voltages to actuators driving the vehicle motions and (ii) one output among the plurality of n outputs serving as the vehicle properties of the vehicle motions;

the number of the designated plurality of combinations is more than one and equal to n being the number of the plurality of n outputs, and thus equal to m being the number of the plurality of m inputs; and the non-interference control by the non-interference controller and the feedback control by the feedback controllers are configured to be executed with respect to each of the designated plurality of combinations of the plurality of m inputs and the plurality of n outputs.

5. The vehicle steering control system according to claim 4, wherein:

the plurality of n outputs provided by the control target include three control quantities that are (i) a steering angle, (ii) a yaw angle velocity, and (iii) a lateral acceleration, the three control quantities being the vehicle properties of the vehicle motions generated based on a driver's steering torque.

6. The vehicle steering control system according to claim 5, wherein:

the control target includes a variable gear transfer steering motor which controls an actual steering angle of a front wheel; and the designated combination is of (i) a motor voltage of the variable gear transfer steering motor that serves as an input of the plurality of m inputs and (ii) the steering angle of the vehicle that serves as an output of the plurality of n outputs.

7. The vehicle steering control system according to claim 5, wherein:

the control target includes an electric power steering motor which assists a steering force by a driver; and the designated combination is of (i) a motor voltage of the electric power steering motor that serves as an input of the plurality of m inputs and (ii) the yaw angle velocity of the vehicle that serves as an output of the plurality of n outputs.

8. The vehicle steering control system according to claim 5, wherein:

the control target includes an active rear steering motor which controls an actual steering angle of a rear wheel; and the designated combination is of (i) a motor voltage of the active rear steering motor that serves as an input of the plurality of m inputs and (ii) the lateral acceleration of the vehicle that serves as an output of the plurality of n outputs.

9. The vehicle steering control system according to claim 5, wherein:

the control target includes a variable gear transfer steering motor which controls an actual steering angle of a front wheel and the designated combination is of (i) a motor voltage of the variable gear transfer steering motor that serves as an input of the plurality of m inputs and (ii) the steering angle of the vehicle that serves as an output of the plurality of n outputs;

the control target includes an electric power steering motor which assists a steering force by a driver, and the designated combination is of (i) a motor voltage of the electric power steering motor that serves as an input of the plurality of m inputs and (ii) the yaw angle velocity of the vehicle that serves as an output of the plurality of n outputs; and the control target includes an active rear steering motor which controls an actual steering angle of a rear wheel, and the designated combination is of (i) a motor voltage of the active rear steering motor that serves as an input of the plurality of m inputs and (ii) the lateral acceleration of the vehicle that serves as an output of the plurality of n outputs.

* * * * *